June 6, 1961 — B. R. SILVER ET AL — 2,986,790
SNAP FASTENER CONSTRUCTION
Filed Aug. 3, 1959 — 2 Sheets-Sheet 1
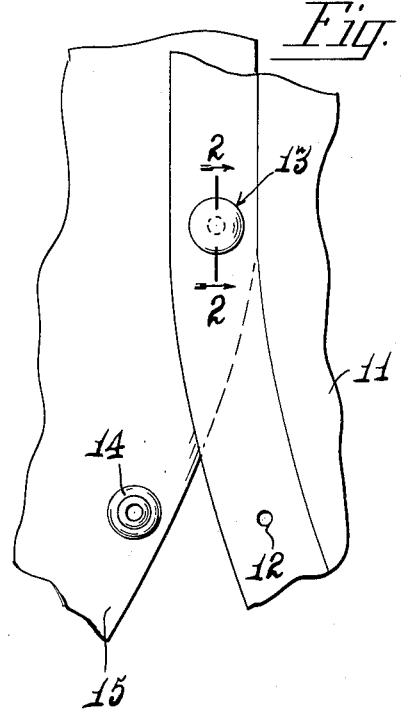
Fig. 1.
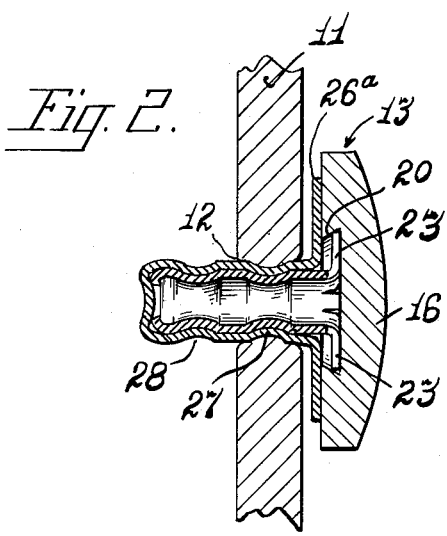
Fig. 2.
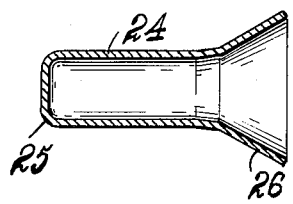
Fig. 5.
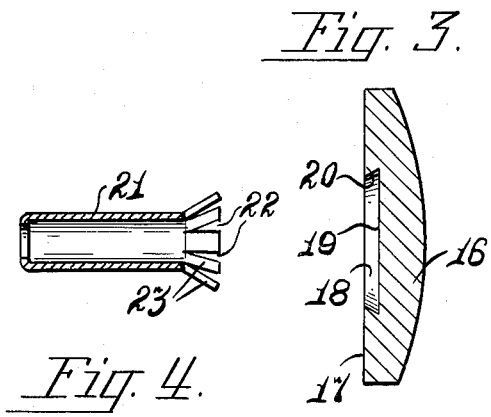
Fig. 3.
Fig. 4.
INVENTORS
Bernard R. Silver
and Harold W. Umlandt
Elmer L. Quickel
Atty.

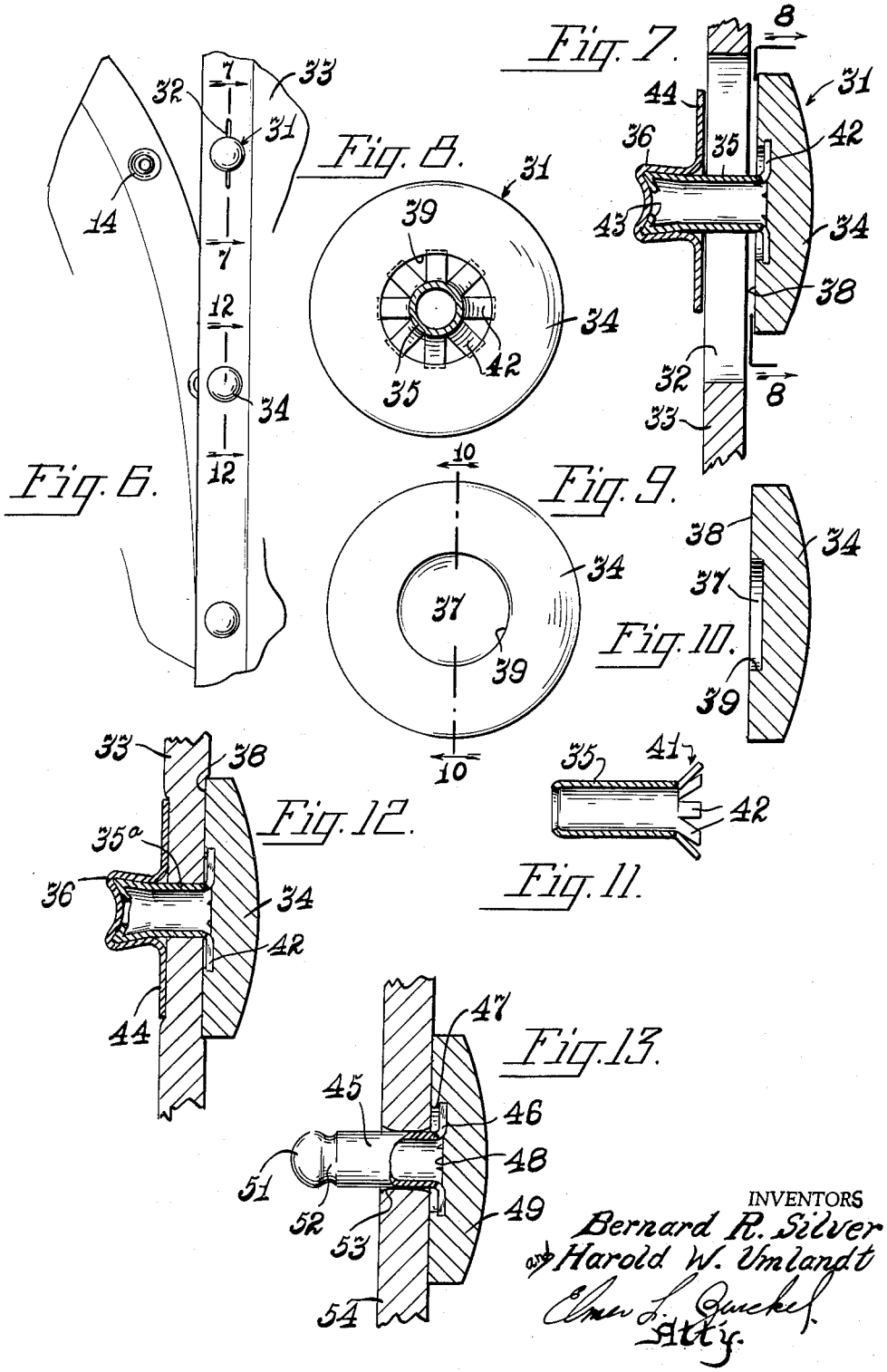

United States Patent Office 2,986,790
Patented June 6, 1961

2,986,790
SNAP FASTENER CONSTRUCTION

Bernard R. Silver, Providence, R.I., and Harold W. Umlandt, Muscatine, Iowa; said Silver assignor to Rau Fastener Company, Providence, R.I., a corporation of Rhode Island; said Umlandt assignor to Automatic Button Company, Muscatine, Iowa, a corporation of Iowa
Filed Aug. 3, 1959, Ser. No. 831,329
5 Claims. (Cl. 24—95)

This invention relates to improvements in snap fastener construction and is particularly concerned with the construction and assembly of a natural or synthetic pearl button-like front and a shank formed to provide a snap fastener stud element, or of a size and shape to have a snap fastener stud element secured thereon in such manner as to be permanently or removably mounted on a garment or other carrying medium.

More specifically, the invention is concerned with a laundry proof type of snap fastener element of a kind having a natural or synthetic pearl button-like front and a post or shank projecting from one face thereof for insertion through an aperture in a garment or other supporting sheet. The projecting end of the shank is formed to or carries means thereon to have engagement with a complemental fastener element carried on an associated part of the garment for securing the parts together releasably. For example, the post or shank may be suitably formed with a head and reduced neck to constitute a stud of a character that will engage in a snap fastener socket. Also, the post or shank may have a separate flanged stud element telescoped thereover and secured thereon so as to provide a snap fastener element that may be permanently attached to a garment or which may be removably mounted in a button hole or eyelet. In the latter assembly, the flange on the stud may be disposed to lie flat against the back face of the button-like front to reinforce same and the stud may be formed with a pair of reduced diameter neck portions spaced apart longitudinally so that when the stud is projected through an eyelet the material will be engaged in the area of one neck portion with the second neck portion disposed for cooperation with a complemental socket element.

Each of the structures outlined hereinabove is further characterized by the structure and mounting of the shank or post on the button-like front. In each instance, the button-like front is formed with an axial recess on one face, having a straight or an undercut side wall and the mounted end of the shank or stud is slit and flared initially into a substantially bell-shaped configuration defined by inclined radial prongs. To mount such a shank on the button-like front, the split-bell-shaped shank end is seated in the recess and upon application of suitable pressure endwise, the split-bell-shaped portion is flattened so as to urge the prongs outwardly radially into flat relationship with the recess bottom. In instances where the button-like front is fabricated from tough plastic material such as "nylon" the ends of the flared prongs will bite into and become embedded in the recess side wall and thereby secure the parts together even though said side wall is straight. Because natural pearl is subjected to becoming cracked or broken if subjected to excessive strain, button-like fronts made of such material may have the recess side wall undercut to receive the prong terminal portions therebeneath. In either event, the shank is seated firmly in the recess and anchored securely to the button-like front.

The aforesaid structures provide fastener elements that are not expensive to manufacture and assemble and which may be incorporated in an element to be mounted permanently to a garment or mounted for easy removal in a button hole or eyelet.

It is an object of the invention to provide a rimless button-like snap fastener element with a novelly attached shank or stud.

Another object is to provide a button type snap fastener element assembly that may be easily and quickly mounted and retained in a button hole or eyelet and be removed therefrom readily.

Another object is to provide a shank with a novelly formed end adapted to be press-fitted securely in a button-like front.

Another object is to provide a button-like snap fastener element with a shank or stud formed to be frictionally retained in an eyelet and having means thereon to cooperate with a complemental snap fastener element.

Structures by which the foregoing and other objects and advantages of the invention are attained will be described in the following specification, taken in conjunction with the accompanying drawings, showing several illustrative embodiments of the invention, in which;

FIG. 1 is a fragmentary elevational view of a garment illustrating one embodiment of the invention.

FIG. 2 is an enlarged sectional view through the garment and the fastener element mounted therein, taken substantially on line 2—2 of FIG. 1.

FIG. 3 is a diametrical sectional view of the button-like front used in the FIG. 2 assembly.

FIG. 4 is a longitudinal sectional view of the shank prior to assembly.

FIG. 5 is a longitudinal sectional view of the flanged stud prior to assembly.

FIG. 6 is a view similar to FIG. 1 showing other embodiments of the button type snap fastener element mounted thereon.

FIG. 7 is an enlarged central sectional view of one of the button type fasteners shown in FIG. 6, taken substantially in line 7—7 of FIG. 6.

FIG. 8 is a sectional detail view taken on line 8—8 of FIG. 7.

FIG. 9 is an elevational view of the bottom face of the button-like front shown in FIG. 7.

FIG. 10 is a sectional view of the button-like front taken on line 10—10 of FIG. 9.

FIG. 11 is a longitudinal sectional view of the shank of the FIG. 7 assembly before attachment.

FIG. 12 is an enlarged sectional view of another button-type fastener element, taken on line 12—12 of FIG. 6.

FIG. 13 is an enlarged sectional view of another embodiment of the invention.

Referring to the accompanying drawings and particularly to the embodiment illustrated in FIGS. 1 through 5, a sheet of supporting material or other carrying medium, such as the garment 11 shown in FIG. 1, has a marginal area that may be provided with mutually spaced piercings or eyelets 12 each adapted to receive therein a button type snap fastener element 13. In the present instance snap fastener element 13 is a male or stud element and it is adapted to be separately engaged with a conventional type of female or socket element 14 carried on an adjacent marginal area 15 of the garment for securing the areas in closed overlapped condition in customary manner.

As best shown in FIG. 2 the male fastener element includes a button-like front 16 which in this instance is fabricated from natural pearl and may be of any planar configuration such as round, oval, square, etc. The bottom face 17 of said front is formed with a shallow central circular recess 18 having a bottom wall 19 and an undercut side wall 20 for a purpose to be explained presently.

A shank 21 preferably fabricated from thin walled tubular metal stock and best shown in FIG. 4 is provided with a plurality of mutually spaced longitudinal slits 22 extending inwardly from one end thereof to provide a plurality of fingers or prongs 23 which are flared outwardly into a substantially bell-shaped configuration. The outside diameter of the bell-shaped slit end of the shank is less than the smallest diameter of recess 18 in front 16 so as to seat therein during assembly.

A stud element 24 having an initially formed configuration substantially as shown in FIG. 5, is adapted to be telescoped over shank 21 during assembly. This element also is fabricated from thin sheet metal stock and has a closed rounded end or head 25 and is flared, as at 26, adjacent to its other or open end.

To assemble, stud element 24 is telescoped over shank 21 and spun or otherwise formed to provide a pair of longitudinally spaced annular recesses 27—28 (FIG. 2) thereby securing the parts together. The sub-assembly then is seated against the bottom face of button front 16 with the flared split end of shank 21 seated in recess 18. Pressure then is applied endwise on the sub-assembly so as to cause the split shank end to flatten and seat firmly against bottom wall 19 of recess 18, as best shown in FIG. 2, and to engage the terminal ends of prongs 23 in the undercut side wall 20 tightly. At the same time, flared end 26 of stud element 24 is flattened against bottom face 17 of the button front in the form of a circular flange 26a. The assembly is such that button front 16 is firmly engaged by and clamped between radial prongs 23 and circular flange 26a and said flange reinforces the button front so as to minimize breakage.

In use, the stud element 24 is passed through an eyelet 12 in the garment or other carrying medium to which it is to be removably mounted. It is retained in place by engagement of the eyelet perimeter in annular recess 17. The projecting stud portion is thereby held positioned for cooperative engagement with a complemental fastener element 14; annular recess 28 being engaged in the usual resilient socket forming a part of the complemental fastener element.

Referring now to the embodiment best illustrated in FIG. 7, the snap fastener element 31 also is of a type that may be removably mounted in a botton hole 32 of a garment or other carrying medium 33. Such mounting is shown at the upper extremity of the composite assembly illustrated in FIG. 6. Fastener element 31 is somewhat similar to the structure previously described and is comprised of a button-like front 34, a shank 35 and a flanged stud 36. Both the shank and the stud are formed from thin sheet metal stock and the button-like front preferably is fabricated from suitable tough plastic material such as "nylon." Because of the resistance to breakage inherent in such material, the circular recess 37 (FIG. 10) formed on the bottom face 38 of said front may have a straight side wall 39 and is of a diameter corresponding substantially to the largest diameter of the ball-shaped split end 41 (FIG. 11) of shank 35. To assemble the shank on the front, its bell shaped end 41 is seated in recess 37 and pressure then is applied endwise to spread the split bell shaped end and cause the radial prongs 42 to assume the flat condition best shown in FIGS. 7 and 8. As shown, the free terminals of radial prongs 42 bite into and are embedded in the material of the recess side wall so as to anchor the shank firmly to the button front.

Stud 36 may be attached firmly to the shank either before, during or after the mounting of the front. In either event, the stud is telescoped over the shank, and is press fitted so as to cause the telescoped shank end to be distorted sufficiently as at 43, to lock it within the stud. In the present disclosure, a relatively long shank 35 is used so that when the assembly is complete, the circular flange 44 on the base of stud 36 is spaced from bottom face 38 of front 34. This permits the assembly to be removably mounted on the garment or other carrying medium by inserting it through button hole 32 in the manner illustrated in FIGS. 6 and 7. It should be quite evident that the fastener element 31 is retained in place on the garment until removed manually.

FIG. 12 illustrates another embodiment which is substantially like that shown in FIG. 7, and in which like numerals are used to identify corresponding parts. In this instance the shank 35a is of a length that permits the garment material or other carrying medium to be clamped firmly between stud flange 44 and bottom face 38 of front 34 so as to mount the fastener element permanently. When mounting, the material may be pre-pierced to receive the shank, or the shank may be driven through the material during the assembly operation.

FIG. 13 is representative of another form of a detachably mounted fastener element. Here, the shank 45 is formed as before with a split bell-shaped end that is press-fitted and flattened to engage its radial prongs 46 in side wall 47 of recess 48 in one face of button-like front 49 which, in this instance, is fabricated from a plastic material. The other end of shank 45 is closed and rounded, as at 51, and it is formed adjacent to said closed end with a neck 52 of reduced diameter. To mount, the shank is passed through a button hole or eyelet 53 in the carrying medium 54 and when engaged with a complemental fastener socket on a companion portion of said carrying medium it is held in place so as to prevent separation of said medium portions. When disengaged from the socket, the asssembly may be removed easily from the carrying medium 54.

Although several embodiments of representative assemblies and installations have been illustrated, it should be understood that either a natural pearl button-like front or a "nylon" or other plastic type button-like front may be utilized in each, it being expressly understood that in each instance the split bell-shaped end of the shank is expanded to cause the free terminals of its radially disposed prongs to engage the wall of the recess by bearing firmly against an undercut therein or being embedded in the material and that other modifications may be had without departing from the spirit and scope of the invention.

We claim:

1. A snap fastener stud element assembly comprising a button-like front fabricated from plastic material, said front having a circular recess on one face including a perpendicular side wall, a tubular shank mounted in said recess, said shank having radial prongs on one end seated in said recess the terminal ends of which are embedded in the side wall, a tubular stud telescoped over the other end of said shank, a base flange on one end of said stud seated tightly against the said face of the button-like front to reinforce the latter, and said stud having longitudinally spaced annular recesses therein for securing the stud to the shank.

2. A snap fastener stud element assembly comprising, in combination, a front member, a recess in one face of said front member, said recess having a peripheral wall, a tubular shank, mutually spaced radial prongs on one end of said shank seated in said recess, said prongs having their terminals embedded into said wall to secure the shank to the front, a stud element telescoped over said shank, a circular flange on said stud element seated tightly against said face of the front, said stud having a circular neck of reduced diameter inwardly of its free end defining a head on said stud end adapted for engagement with a complemental fastener element, and the stud having a second circular neck of reduced diameter spaced longitudinally from the first neck.

3. A snap fastener stud element assembly comprising a button-like front fabricated from plastic material, said front having a circular recess on one face including a perpendicular side wall, a tubular shank mounted in said recess, said shank having radial prongs on one end seated in said recess, the terminal ends of which are embedded in the side wall, a tubular stud telescoped over the other end of said shank, a base flange on one end of said stud seated tightly against the said face of the button-like front to reinforce the latter, and the stud having annular recesses spaced apart longitudinally thereof for securing the stud to the shank and providing reduced necks, one to engage in a carrying medium for retaining the assembly thereon and the other to cooperate with a complemental fastener element.

4. A snap fastener stud element assembly comprising a button-like front fabricated from plastic material, said front having a circular recess on one face including a perpendicular side wall, a tubular shank mounted in said recess, said shank having radial prongs on one end seated in said recess the terminal ends of which are engaged with the sidewall, a tubular stud telescoped over the other end of said shank, a base flange on one end of said stud seated against the said face of the button-like front to reinforce the latter, and said stud having annular recesses spaced apart longitudinally thereof for securing the stud to the shank.

5. A snap fastener stud element assembly comprising, in combination, a front member, a recess in one face of said front member, said recess having a peripheral wall, a tubular shank, mutually spaced radial prongs on one end of said shank seated in said recess, said prongs having their terminals embedded in said wall to secure the shank to the front, a stud element telescoped over said shank, said stud element having a circular neck of reduced diameter inwardly of its free end and defining a head on said free end adapted for engagement with a complemental fastener element, and said stud having a second circular neck spaced longitudinally from the first neck.

References Cited in the file of this patent

UNITED STATES PATENTS

| | | |
|---|---|---|
| 484,792 | Hall | Oct. 25, 1892 |
| 485,111 | Nester | Oct. 25, 1892 |
| 1,545,096 | Hillihan | July 7, 1925 |
| 2,051,405 | Cox | Aug. 18, 1936 |
| 2,129,356 | Kelly | Sept. 6, 1938 |
| 2,520,261 | Silman | Aug. 29, 1950 |
| 2,648,110 | Baskind | Aug. 11, 1953 |
| 2,683,908 | Carpinella | July 20, 1954 |
| 2,796,650 | Van Buren | June 25, 1957 |

FOREIGN PATENTS

| | | |
|---|---|---|
| 17,948 | Great Britain | 1895 |
| 85,246 | Germany | Feb. 13, 1896 |
| 582,564 | France | Oct. 16, 1924 |
| 1,103,270 | France | May 18, 1955 |